United States Patent
Lanfrey et al.

(10) Patent No.: US 11,198,091 B2
(45) Date of Patent: Dec. 14, 2021

(54) PROCESS FOR DEHYDRATING A HYDROCARBON-BASED GAS

(71) Applicant: AXENS, Rueil-Malmaison (FR)

(72) Inventors: Pierre-Yves Lanfrey, Rueil-Malmaison (FR); Guillaume Parer, Rueil-Malmaison (FR); Bernard Chambon, Rueil-Malmaison (FR)

(73) Assignee: AXENS, Rueil-Malmaison (FR)

( * ) Notice: Subject to any disclaimer, the term of this patent is extended or adjusted under 35 U.S.C. 154(b) by 225 days.

(21) Appl. No.: 16/418,158

(22) Filed: May 21, 2019

(65) Prior Publication Data
US 2020/0129919 A1    Apr. 30, 2020

(30) Foreign Application Priority Data

Oct. 26, 2018    (FR) ..................... 18/71.313

(51) Int. Cl.
*B01D 53/26* (2006.01)
*B01D 3/14* (2006.01)
(Continued)

(52) U.S. Cl.
CPC .............. *B01D 53/263* (2013.01); *B01D 3/14* (2013.01); *B01D 53/002* (2013.01); *B01D 53/1425* (2013.01); *B01D 53/265* (2013.01); *C10L 3/106* (2013.01); *B01D 2252/2023* (2013.01); *C10L 2290/08* (2013.01); *C10L 2290/543* (2013.01)

(58) Field of Classification Search
CPC ........ B01D 53/26; B01D 53/00; B01D 53/14; B01D 3/14; C10L 3/10
See application file for complete search history.

(56) References Cited

U.S. PATENT DOCUMENTS

| 3,105,748 A | 10/1963 | Stahl |
| 3,736,725 A | 6/1973 | Alleman et al. |

(Continued)

FOREIGN PATENT DOCUMENTS

| EP | 0598657 B1 | 6/1996 |
| EP | 1372824 B1 | 8/2004 |

OTHER PUBLICATIONS

Florida Power and Light Company (Natural Gas Specs Sheet, 2004) (Year: 2004).*
Search Report in FR1871313 dated Jul. 25, 2019 (pp. 1-3).

*Primary Examiner* — Youngsul Jeong
(74) *Attorney, Agent, or Firm* — Millen White Zelano and Branigan, PC; John Sopp

(57) ABSTRACT

The present invention proposes to use a dry stream which is rich in C4 to C10 hydrocarbons as stripping agent for improving the regeneration of the liquid desiccant according to the invention. This dry stream rich in C4 to C10 hydrocarbons is extracted from the gas derived from the dehydration, for example during a step of extraction of NGL located downstream of the gas dehydration unit. The stream of stripping agent recovered at the outlet of the liquid desiccant regeneration unit may be recycled into the process of the invention or sent to a unit external to the process according to the invention. For example, this stream of stripping agent recovered at the outlet of the regeneration unit is sent to a unit which can receive wet condensates, such as a three-phase separation unit at the inlet of a crude gas processing plant, a condensate stabilization unit, etc.

13 Claims, 2 Drawing Sheets

(51) Int. Cl.
*B01D 53/00* (2006.01)
*B01D 53/14* (2006.01)
*C10L 3/10* (2006.01)

(56) References Cited

U.S. PATENT DOCUMENTS

| | | | |
|---|---|---|---|
| 4,009,083 A | | 2/1977 | Lyon et al. |
| 5,453,114 A | * | 9/1995 | Ebeling ................ B01D 53/263 95/166 |
| 5,501,776 A | | 3/1996 | Lermite et al. |
| 7,074,258 B2 | | 7/2006 | Collins et al. |
| 2008/0041228 A1 | * | 2/2008 | Seibert ................ B01D 53/263 95/166 |

* cited by examiner

PROCESS FOR DEHYDRATING A HYDROCARBON-BASED GAS

TECHNICAL FIELD

The invention relates to a process for dehydrating a gas by means of a liquid desiccant, using an open loop of a stream of hydrocarbons.

PRIOR ART

The dehydration of a gas, for example of a natural gas or of a refinery gas, is a conventional operation. It makes it possible to control the water dew point, i.e. the water content of the gas, to avoid the formation of hydrates or of ice during the transportation or use of this gas, to reduce the risks of corrosion, or for any other reason.

For this purpose, it is common practice to place the gas in contact with a hydrophilic liquid desiccant. Among these desiccants, compounds of the chemical family of glycols are in very widespread use.

For example, U.S. Pat. No. 3,105,748 describes a glycol regeneration process according to the prior art. Such a regeneration unit includes a thermal step for semi-regenerating the glycol by separation, by performing evaporation of the water contained in the liquid glycol. This separation involves a system for distilling the glycol charged with water. In addition, U.S. Pat. No. 3,105,748 proposes a step of stripping the semi-regenerated glycol with a portion of natural gas which has been dehydrated, without any other separation, and is thus rich in methane, to push the regeneration of the liquid glycol. However, a methane-rich stripping agent is not the most efficient for regenerating glycol charged with water.

Moreover, U.S. Pat. No. 5,643,421 describes a process for separating out and removing the water contained in a mixture of gas and water by means of a liquid desiccant, and also the removal of the water from the liquid desiccant in order to be able to reuse the dehydrated liquid desiccant. This process proposes to use a hydrocarbon fraction such as naphthas or gasolines as stripping agent to further improve the purity of the liquid desiccant, in comparison with the process described in U.S. Pat. No. 3,105,748. According to U.S. Pat. No. 5,643,421, the stripping agent is obtained at least partly by means of the absorption of the hydrocarbons by the liquid desiccant during the contact between the gas to be dehydrated and the regenerated desiccant. After use in the stripping column, the stripping agent is partly recovered by condensation/separation, and optionally dehydrated with a solid adsorbent, so as to be revaporized and used again as stripping agent. This process significantly improves the purity of the liquid desiccant and thus the possible lowering of the water dew point of the gas to be dehydrated, notably when the stripping agent is dehydrated before being sent to the stripping column. However, the Applicant has noted that the necessary supplement of hydrocarbon fraction to maintain the inventory in the closed loop of stripping agent cannot always be ensured solely by the co-absorption of hydrocarbons by the liquid desiccant from the gas or during start-up. Consequently, a supplement from an external source of stripping agent may be necessary. Furthermore, the process requires a specific device to regenerate the stripping agent charged with water.

Furthermore, the Applicant has observed that certain gases to be dried contain very heavy hydrocarbons (of C12+) in low contents (for example in contents of the order of 1 to 10 ppm by weight). Although the amounts are very small, these very heavy hydrocarbon compounds may be strongly absorbed by the liquid desiccant and may rapidly accumulate in the regeneration loop of the liquid desiccant of the process described in U.S. Pat. No. 5,643,421. Accumulation of these very heavy hydrocarbons reduces the capacity of the liquid desiccant to dehydrate the gas and obliges the operators to perform purging or skimming of the hydrocarbons, which may lead to losses of liquid desiccant.

SUMMARY OF THE INVENTION

In the present description, the term "hydrocarbons Cx" denotes hydrocarbon compounds including x carbon atoms. The term "Cx+ hydrocarbons" denotes hydrocarbon-based compounds containing at least x carbon atoms. The term "Cx to Cy hydrocarbons" denotes hydrocarbon compounds containing between x and y carbon atoms.

In the present description, the term "rich in compound X" means that the fraction or stream includes at least 50%, or even at least 70%, or even at least 80% by weight of the compound X.

The present invention proposes to use a dry stream which is rich in C4 to C10 hydrocarbons as stripping agent for improving the regeneration of the liquid desiccant according to the invention. This dry stream rich in C4 to C10 hydrocarbons is extracted from the gas derived from the dehydration, for example during a step of extraction of liquids from natural gas located downstream of the gas dehydration unit. The stream of stripping agent recovered at the outlet of the liquid desiccant regeneration unit may be recycled into the process of the invention or sent to a unit external to the process according to the invention. For example, this stream of stripping agent recovered at the outlet of the regeneration unit is sent to a unit which can receive wet condensates, such as a three-phase separation unit at the inlet of a crude gas processing plant, a condensate stabilization unit, etc.

In addition, the present invention proposes a device for preventing the accumulation of heavy hydrocarbon compounds in the liquid desiccant regeneration unit.

One subject of the present invention is a process for dehydrating a wet hydrocarbon-based gas, in which the following steps are performed:

a) a crude hydrocarbon-based gas including methane, at least C4+ hydrocarbons and water is supplied, and b) a three-phase separation is performed on said crude hydrocarbon-based gas, to obtain a wet hydrocarbon-based gas, hydrocarbon-based liquid condensates and an aqueous liquid effluent, and said wet hydrocarbon-based gas is sent to step c), c) said wet hydrocarbon-based gas is placed in contact with a regenerated desiccant liquid obtained in step e) to obtain a dehydrated gas and a desiccant liquid charged with water, d) separation of a fraction rich in C4 to C10 hydrocarbon compounds contained in the dehydrated gas is performed to obtain a residual gas depleted in C4+ hydrocarbons and a vapour stream rich in C4 to C10 hydrocarbons, e) the desiccant charged with water obtained in step c) is regenerated by performing at least one step of stripping the desiccant charged with water by placing in contact with the vapour stream rich in C4 to C10 hydrocarbons obtained in step d) to obtain the regenerated desiccant liquid and a fraction rich in C4 to C10 hydrocarbons and including water, step f) is then performed according to one of the two variants:

variant 1: said fraction rich in C4 to C10 hydrocarbons and including water is removed from said process variant 2: said fraction rich in C4 to C10 hydrocarbons and including water is sent into step b) in which a three-phase separation is performed of said crude hydrocarbon-based gas and also the fraction rich in C4 to C10 hydrocarbons and including water obtained from step e).

Preferably, in variant 2 in step b), the crude hydrocarbon-based gas is mixed with the fraction rich in C4 to C10 hydrocarbons and including water before performing the three-phase separation.

Preferably, in variant 2 in step b), the three-phase separation is performed in at least one separating vessel and in which the crude hydrocarbon-based gas and the fraction rich in C4 to C10 hydrocarbons and including water are separately introduced into at least one separating vessel.

Preferably, in step d), the following steps are performed:

i) at least a portion of the C4+ hydrocarbons contained in the dehydrated gas is extracted to produce a stream rich in C4+ hydrocarbons, ii) the stream rich in C4+ is distilled to produce a stream enriched in C4 to C10 hydrocarbons, iii) at least a portion of the stream enriched in C4 to C10 hydrocarbons is vapourized by heating to produce the vapour stream rich in C4 to C10 hydrocarbons.

Advantageously, in step iii), a portion of the stream enriched in C4 to C10 hydrocarbons is vapourized and the vapourized portion is then overheated to produce the vapour stream rich in C4 to C10 hydrocarbons and the non-vapourized portion of the stream enriched in C4 to C10 hydrocarbons is removed from the process in liquid form.

Advantageously, in step iii), all of the stream enriched in C4 to C10 hydrocarbons is vapourized and the vapourized stream is then overheated to produce the vapour stream rich in C4 to C10 hydrocarbons.

Advantageously, in step iii), the stream enriched in C4 to C10 hydrocarbons is overheated to produce the vapour stream rich in C4 to C10 hydrocarbons.

Preferably, the vapourization is performed by heating at a temperature of between 80° C. and 200° C. and a pressure of from 0.1 to 0.5 MPa and overheating is performed at a temperature of between 210° C. and 250° C. and a pressure of from 0.1 to 0.5 MPa.

Preferably, in step e), before performing the stripping step, a step of distillation of the desiccant charged with water is performed to remove in vapour form at least a portion of the water and to obtain a partially regenerated liquid desiccant stream, and said step of stripping the partially regenerated liquid desiccant stream is then performed by placing in contact with the vapour stream rich in C4 to C10 hydrocarbons obtained in step d) to obtain the regenerated desiccant liquid and a fraction rich in C4 to C10 hydrocarbons and including water.

Preferably, in step e), the placing in contact of the vapour stream rich in C4 to C10 hydrocarbons with the desiccant liquid charged with water makes it possible to obtain the regenerated desiccant liquid, and also a vapour stream rich in C4 to C10 hydrocarbons and containing water, which is at least partially condensed to obtain the fraction rich in C4 to C10 hydrocarbons and including water at least partially in liquid form.

Advantageously, the gas is a natural gas or a refinery gas produced at a temperature T>20° C., at a pressure P>1 MPa, the gas being at least saturated with water or with hydrocarbons at the temperature T and at the pressure P.

Advantageously, the desiccant liquid is chosen from the chemical family of glycols.

Advantageously, the operating conditions of the separation in step d) are chosen so that the vapour stream enriched in C4 to C10 hydrocarbons comprises aromatic hydrocarbons.

The present invention makes it possible to avoid supplying an external stream to regenerate the desiccant. The process according to the invention can thus function readily on an isolated site, for example on a barge at sea (offshore).

The present invention makes it possible to remove the heavy hydrocarbons, notably the C12+, or even C15+, hydrocarbons which may contaminate the liquid desiccant if the stream of gas to be treated contains any before use of the present invention.

Moreover, the process according to the invention may be readily performed by modifying an existing conventional dehydration unit.

Finally, the process according to the invention is easy to implement, and in particular does not require the use of a liquid-liquid coalescer or of water-adsorbing solid to dehydrate the stripping agent.

BRIEF DESCRIPTION OF THE DRAWINGS

The invention will be described in detail below with the aid of non-limiting examples of the process according to the invention, illustrated by the following figures.

DESCRIPTION OF THE EMBODIMENTS

Steps a) to e) of the dehydration process according to the invention are described in detail below.

Step a): A crude hydrocarbon-based gas including methane, at least C4+ hydrocarbons and water is supplied.

Figure 1:
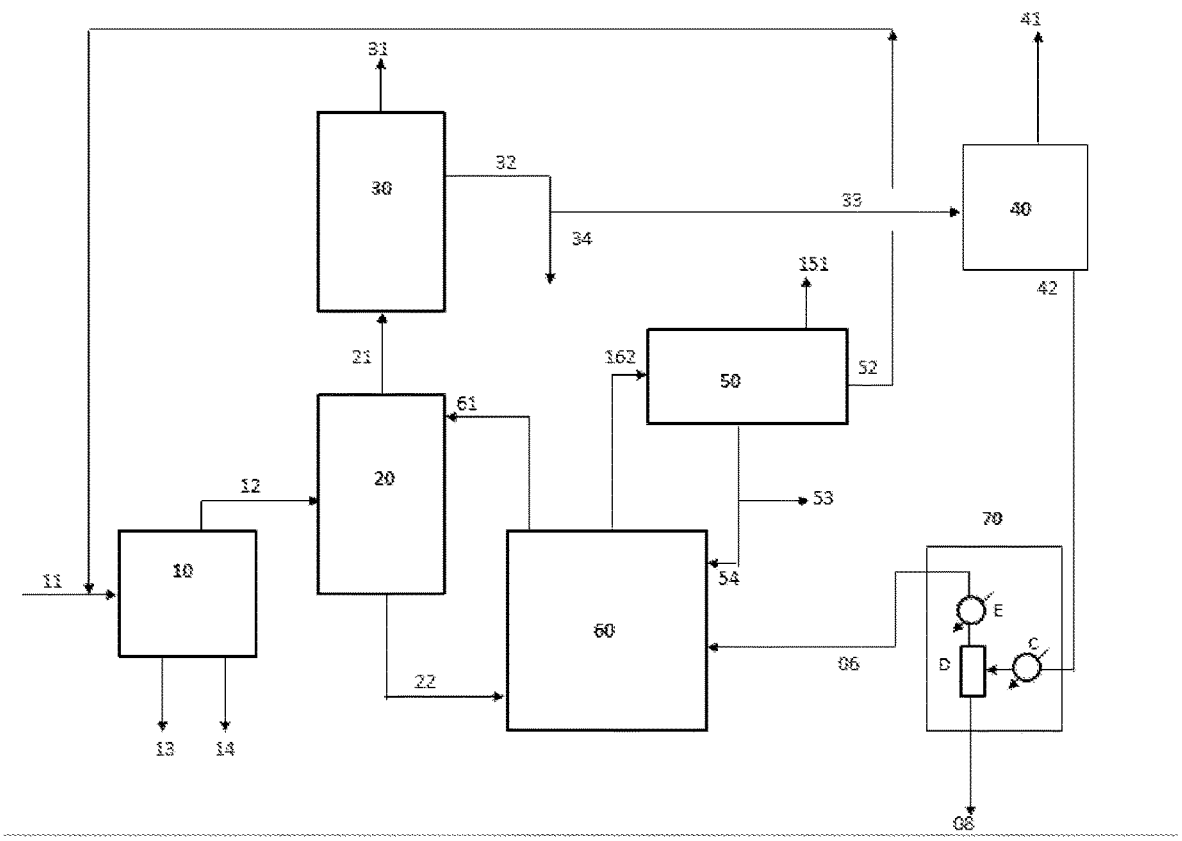
FIG. 1 is a synoptic representation, of block diagram type, of the general principle of the process for dehydrating a crude hydrocarbon-based gas according to the invention.

With reference to FIG. 1, the crude hydrocarbon-based gas to be treated arrives via pipe 11.

The crude hydrocarbon-based gas contains methane, C4+ hydrocarbons and water. The invention is particularly suitable for treating a gas including C12+ or even C15+ hydrocarbons, even in very small amount, i.e. in contents possibly less than 10 ppm by weight.

The crude hydrocarbon-based gas may be a natural gas or a refinery gas. In particular, the gas may be a crude natural gas obtained at the outlet of a production well, for example on a platform or barge at sea (offshore).

The crude hydrocarbon-based gas may be saturated or supersaturated with water and/or with hydrocarbons, i.e. it is at its dew point with water and/or hydrocarbon, at the pressure and temperature at which it is available. The hydrocarbon-based gas may also be supersaturated with water and/or hydrocarbons, i.e. it contains an amount of water and/or of hydrocarbons in liquid form.

The crude hydrocarbon-based gas may be available at high pressure, for example at a pressure of between 0 and 10 MPa, preferably greater than 1 MPa, for example at a pressure of between 2 and 12 MPa. The crude hydrocarbon-based gas may be at a temperature of between 0° C. and 100° C., preferably at a temperature greater than 20° C., for example at a temperature of between 40° C. and 80° C.

Step b): A three-phase separation of said crude hydrocarbon-based gas, and also optionally a fraction rich in C4 to C10 hydrocarbons and including water, is performed to obtain a wet hydrocarbon-based gas, hydrocarbon-based liquid condensates and an aqueous liquid effluent.

With reference to FIG. 1, the crude hydrocarbon-based gas arrives via pipe 11 into the three-phase separation unit 10. In unit 10, the gas undergoes at least one of the steps of liquid-liquid separation and of gas-liquid separation.

If necessary, the gas may also be cooled in unit 10, for example to a temperature of between 20 and 60° C., preferably between 20 and 40° C. Cooling of the gas makes it possible to condense water and heavy hydrocarbons in larger proportions. The separation between the gas, the liquid water and the liquid hydrocarbons may be performed in one or more separating vessels. Unit 10 may also include, if necessary, an additional system for treating the wet gas separated out, for instance a system for removing acidic gases (for example by absorption with an absorbent solution including amines).

The liquid water is evacuated from unit 10 via pipe 13. Liquid heavy hydrocarbons are removed via pipe 14. A gas generally depleted at least in heavy hydrocarbons and in water, relative to the crude gas arriving via pipe 11, is removed from unit 10 via pipe 12.

A fraction rich in C4 to C10 hydrocarbons and in water produced by the process according to the invention may also be subjected to the three-phase separation step b). With reference to FIG. 1, this fraction arrives via pipe 52. This fraction may be mixed with the crude hydrocarbon-based gas arriving via pipe 11. This fraction may also be introduced directly into unit 10, for example by being introduced into the separating vessel or into one of the separating vessels if several separating vessels are used, or sent to any unit that can receive wet condensates.

Step c): The wet hydrocarbon-based gas is placed in contact with a regenerated liquid desiccant obtained in step e) to obtain a dehydrated gas and a liquid desiccant charged with water.

According to the invention, the wet hydrocarbon-based gas may also originate from a source other than steps a) and b) described above. The wet hydrocarbon-based gas contains methane, C4+ hydrocarbons and water. The wet hydrocarbon-based gas may be saturated with water and/or with hydrocarbons, i.e. it is at its dew point with water and/or hydrocarbon, at the pressure and temperature at which it is available. The wet hydrocarbon-based gas may be available at high pressure, for example at a pressure of between 0 and 10 MPa, preferably greater than 1 MPa, for example at a pressure of between 2 and 12 MPa. The wet hydrocarbon-based gas may be at a temperature of between 0° C. and 100° C., preferably at a temperature greater than 20° C., for example at a temperature of between 40° C. and 80° C.

With reference to FIG. 1, the wet gas circulating in pipe 12 is introduced into the dehydration unit 20 to be placed in contact with the regenerated liquid desiccant arriving via pipe 61.

The liquid desiccant may be chosen from the chemical family of glycols. For example, triethylene glycol (TEG), monoethylene glycol (MEG), diethylene glycol (DEG) or tetraethylene glycol (T4EG) is used. Preferably, according to the invention, triethylene glycol (TEG) is used on account of its high affinity for water, its chemical stability and its low cost.

In unit 20, the wet gas may be placed in contact countercurrentwise with the liquid desiccant in a column equipped, for example, with loose, structured packing or with distillation plates. The gas is introduced into a bottom level of the column, the liquid desiccant being introduced into a top level of the column. During the contact of the gas with the liquid desiccant, the water contained in the gas is absorbed by the liquid desiccant so as to produce a dehydrated gas and a liquid desiccant charged with water. For example, the dehydrated gas may have a water content of less than 5 ppm by volume, preferably less than 1 ppm by volume.

The dehydrated gas is removed via pipe 21 of unit 20. The liquid desiccant charged with water is removed from unit 20 via pipe 22, to be introduced into the regeneration unit generally composed of units 50 and 60.

Step d): Separation of a fraction of C4 to C10 hydrocarbon compounds contained in the dehydrated gas is performed to obtain a residual gas depleted in C4+ hydrocarbons and a vapour stream rich in C4 to C10 hydrocarbons, The dehydrated gas circulating in pipe 21 is introduced into a natural gas liquid extraction unit 30 (commonly referred to as the NGL extraction unit). For example, unit 30 uses expansion and/or cooling steps allowing the condensation of hydrocarbons at low temperature. For example, unit 30 uses expansion of the gas, for example in a valve or a turbomachine, or an external cooling loop or a combination of these methods to supply the necessary cooling of the entering gas. The condensed hydrocarbons are separated from the gas in liquid form. The extracted liquid hydrocarbons may then, if necessary, be stabilized in unit 30, for example by removing the ethane by distillation, to ensure the quality and the quantity required for the residual gas (stream 31) or those of the NGL (stream 34) produced by the gas treatment installation. Thus, unit 30 makes it possible to extract the heaviest hydrocarbon compounds and notably the C4+ contained in the dehydrated gas. Preferably, the operating conditions for the functioning of unit 30 are adapted so as to extract a maximum amount of aromatic compounds (commonly referred to as BTX) with the NGL fraction produced. The operating conditions of unit 30 may be chosen by the needs associated with the hydrocarbon dew point specification of the gas removed via pipe 31 or the desired degree of recovery of upgradable hydrocarbons in liquid form (for example NGL or C5+) removed via pipe 34.

The residual gas is removed from unit 30 via pipe 31. This residual gas is depleted in C4+ hydrocarbons relative to the dehydrated gas entering unit 30 via pipe 21. The stream rich in C4+ hydrocarbons (also known as NGL) which have been extracted from the dehydrated gas by unit 30 is removed via pipe 32. A portion of this stream may be removed from the process via pipe 34.

The other portion, or all, of the stream rich in C4+ hydrocarbons is introduced into a stabilization unit 40 via pipe 33 to produce a fraction enriched in C4 to C10 hydrocarbons. Preferably, the functioning of the stabilization unit 40 is adapted to produce a liquid fraction rich in C4 to C10 hydrocarbons including aromatic compounds. The configuration of the stabilization unit 40 may vary, for example, according to the quality of the NGL entering and the required quality of the fraction rich in C4 to C10 hydrocarbons (notably the bubble point and the dew point). Preferably, unit 40 is composed of a distillation column equipped with a reboiling system. If need be, the distillation column may be equipped with a reflux system to allow appropriate distillation.

Unit 40 generates a gaseous fraction removed via pipe 41 and which may optionally be recycled, and the liquid fraction rich in C4 to C10 hydrocarbons which is removed via pipe 42.

According to a first variant of the invention, the fraction rich in C4 to C10 hydrocarbons is introduced via pipe 42 into the vapourization unit 70, which makes it possible to vapourize and to overheat the fraction rich in C4 to C10 hydrocarbons. In this case, unit 70 is composed of one or more heat exchangers, which make it possible to heat the fraction rich in C4 to C10 hydrocarbons to a temperature of between 210° C. and 250° C., preferably to a temperature of between 215° C. and 230° C. This first variant is not in accordance with the representation of unit 70 in FIG. 1.

According to a second variant of the invention, illustrated by unit 70 in FIG. 1, the fraction rich in C4 to C10 hydrocarbons is introduced via pipe 42 into the separation and vapourization unit 70 which makes it possible to extract the heaviest hydrocarbon compounds, notably the C15+ hydrocarbon compounds. The fraction rich in C4 to C10 hydrocarbons is vapourized in two steps. With reference to FIG. 1, a first vapourizer C vapourizes the fraction rich in C4 to C10 hydrocarbons partially or totally depending on the content of heavy hydrocarbons (i.e. C12+ or even C15+ hydrocarbons), for example at a temperature of between 80° C. and 200° C., preferably between 110° C. and 190° C., or even between 150° C. and 180° C. and, for example, at a pressure of between 0.1 and 0.5 MPa, typically between 0.15 and 0.25 MPa. The heavy hydrocarbons which have not been vapourized are separated out in liquid form in the separator D and removed from the process via pipe 8. Unit 70 thus makes it possible to extract the heavy hydrocarbon compounds from the fraction rich in C4 to C10 hydrocarbons. The composition of the fraction rich in C4 to C10 hydrocarbons arriving via pipe 42 may vary as a function of the composition of the crude hydrocarbon-based gas to be treated and may be adjusted by modifying the operating conditions of units 30 and 40 in the course of the operation.

Next, the fraction rich in C4 to C10 hydrocarbons in vapour form originating from the separator D is overheated, for example to a temperature of between 210° C. and 250° C., preferably between 215° C. and 230° C., and, for example, at a pressure of between 1 and 5 bar absolute, typically between 0.15 and 0.25 MPa, in the overheater E. The overheated fraction rich in C4 to C10 hydrocarbons is introduced via pipe 06 into the desiccant regeneration unit 60.

Figure 2:
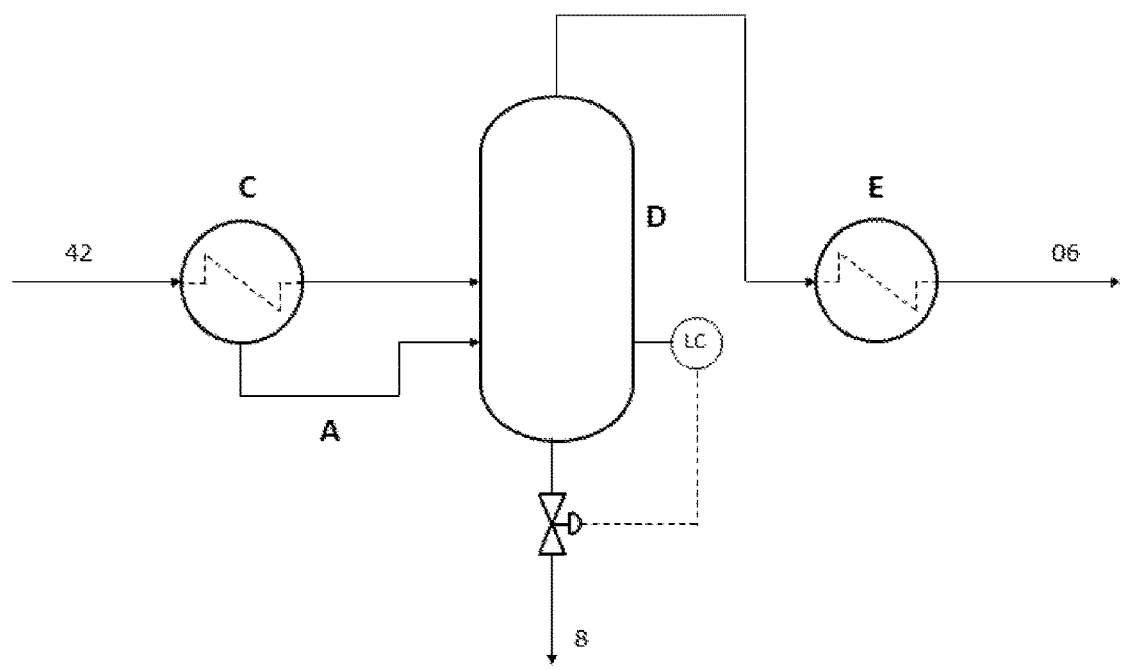
FIGS. 2 and 3 represent two embodiments of the separation unit 70 shown in FIG. 1.
Figure 3:
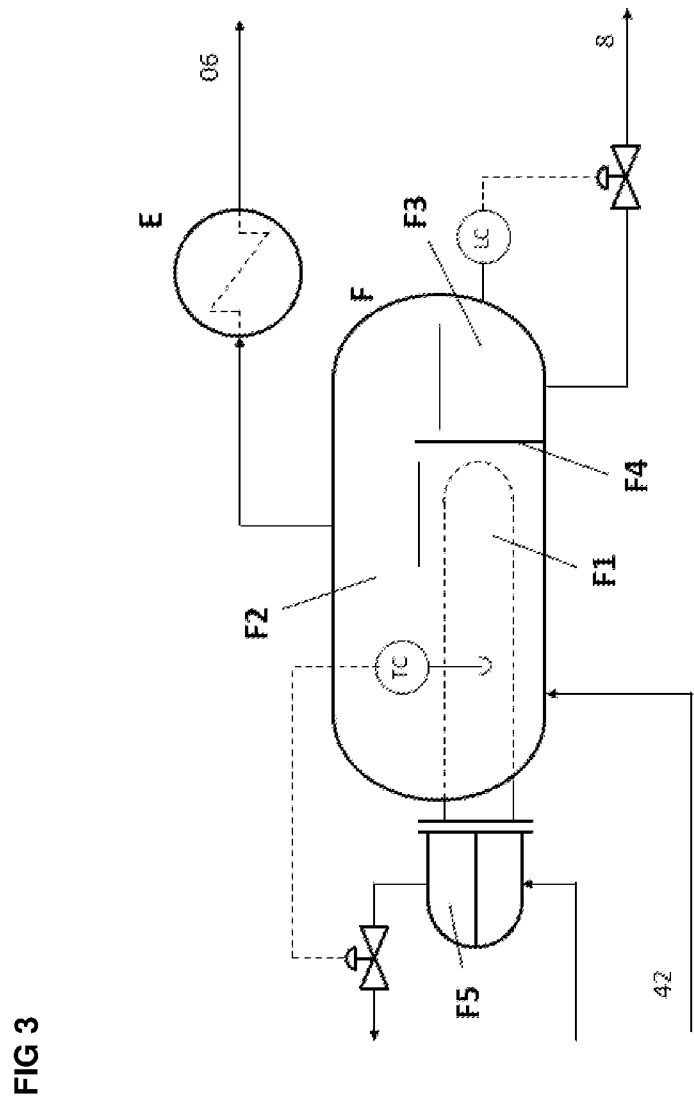

FIGS. 2 and 3 show two implementation examples of unit 70. The references in FIGS. 2 and 3 which are identical to those of FIG. 1 denote the same elements.

With reference to FIG. 2, the fraction rich in C4 to C10 hydrocarbons originating from unit 40 via pipe 42 is first heated to an intermediate temperature, for example between 150° C. and 180° C. in the heat exchanger C. The heat exchanger C may be of the plate or tubular type using a hot fluid, for example the regenerated desiccant, hot oil, or steam. As a function of the composition of the fraction rich in C4 to C10 hydrocarbons, the heating performed in the heat exchanger C makes it possible to perform total or partial vapourization. The fraction rich in C4 to C10 hydrocarbons obtained from C is introduced into the separating vessel D where the non-vapourized heavy hydrocarbons, if any, are separated from the gaseous phase so as to be extracted from the process via pipe 8. For example, the removal via pipe 8 is controlled by a valve controlled by the liquid level detector LC in the separating vessel D. The gaseous phase removed from the separating vessel D is sent to the heat exchanger E, also known as the overheater, which may be electric or may use a hot fluid so as to be heated to a temperature of between 210° C. and 250° C., preferably between 215° C. and 230° C. The overheated vapour is then removed via pipe 06 in the liquid desiccant regeneration device 60.

In one particular embodiment of the invention, the heat exchanger C may include a draining system which makes it possible to extract non-vapourized liquid in the exchanger C to introduce it into the separating vessel D. The draining of the liquid may be performed by gravity. For example, a pipe A connects the exchanger C to the vessel D, pipe A being connected to a bottom point of the heat exchanger C. This embodiment is particularly suitable for a heat exchanger of tubular type.

According to another particular embodiment of the invention illustrated by FIG. 3, the heat exchanger C and the separating vessel D of unit 70 are fused into a single device composed of a liquid-bath reboiler F, commonly known as a kettle. The reboiler is composed of a chamber including two zones F1 and F3 located in the lower part of the chamber and a zone F2 located in the upper part of the chamber. Zones F1 and F3 are separated by a wall F4 which may extend from the bottom of the chamber to mid-height to form the two separate zones F1 and F3. The fraction rich in C4 to C10 hydrocarbons originating from unit 40 is introduced into the first zone F1 via pipe 42. The heating device F5 makes it possible to heat the liquid in zone F1. The heating device F5 may use a hot liquid, but may also use electric heating elements. Under the action of the heating device F5, the vapour is generated in zone F2 and is removed to be introduced into the overheater E. The overheated vapour is then removed via pipe 6 in the desiccant regeneration device 60. The liquid arriving into zone F1 and which is not vapourized overflows from zone F1 over the wall F4 in zone F3: these are non-vapourized heavy hydrocarbons. These liquid heavy hydrocarbons are removed via pipe 8. For example, the removal via pipe 8 is controlled by a valve controlled by the liquid level detector LC in zone F3.

The design of the bath reboiler F makes it possible to operate in two modes.

Partial vapourizer mode. In this mode, the operating temperature of the heating bath in zone F1 is set at its maximum admissible level, for example at a temperature of between 80° C. and 200° C., preferably between 110° C. and 190° C., or even between 150° C. and 180° C., and, for example, at a pressure of between 0.1 and 0.5 MPa, typically between 0.15 and 0.25 MPa. The portion of the fraction rich in C4 to C10 hydrocarbons which is not vapourized at this temperature, i.e. the heavy hydrocarbons, flow by overflow over the wall F4 from zone F1 into zone F3. The heavy hydrocarbons are extracted from zone F3 via pipe 8, for example under control of the level of liquid in zone F3.

Total vapourizer mode. In this case in which the fraction rich in C4 to C10 hydrocarbons does not contain any heavy hydrocarbons, it is totally vapourized in zone F1, for example at a temperature not exceeding 180° C., preferably at a temperature of between 80° C. and 200° C., preferably between 110° C. and 190° C., or even between 150° C. and 180° C., and a pressure of between 0.1 and 0.5 MPa, typically between 0.15 and 0.25 MPa. The operating temperature in zone F1 is adjusted so that the level of liquid in zone F1 is above the heating device F5 but below the upper edge of the wall F4.

Step e): The desiccant charged with water obtained in step c) is regenerated by performing at least one step of stripping the desiccant charged with water by placing in contact with the vapour stream rich in C4 to C10 hydrocarbons obtained in step d) to obtain the regenerated desiccant liquid and a fraction rich in C4 to C10 hydrocarbons and including water.

With reference to FIG. 1 in the regeneration unit 60, regeneration of the desiccant is performed by performing a stripping step and generally also a thermal regeneration step upstream of the stripping step. For example, a step of thermal regeneration of the desiccant charged with water arriving via pipe 22 is performed to obtain a partially regenerated desiccant. The regeneration is then continued by performing a step of stripping of the partially regenerated desiccant. The thermal regeneration step may be performed in a distillation column, which may be equipped with a reboiler at the bottom of the column to vapourize and remove a portion of the water contained in the liquid desiccant in vapour form. The liquid stream of partially regenerated desiccant obtained from the distillation column is then placed in contact with the vapour stream rich in C4 to C10 hydrocarbons, also known as the stripping agent, arriving via pipe 6. The regenerated desiccant liquid obtained after the stripping step, i.e. depleted in water relative to the liquid arriving via pipe 22, is sent via pipe 61 to the dehydration unit 20. The vapour stream rich in C4 to C10 hydrocarbons and charged with water is removed from the regeneration unit 60 via pipe 162.

In the regeneration unit, the placing in contact between the desiccant liquid and the stripping agent may be performed in a column, commonly known as a stripping column, in which the desiccant liquid circulates counter-currentwise with respect to the vapour stream rich in C4 to C10 hydrocarbons. The stripping column may include inserts, for example bulk or structured packing, or distillation plates to promote the contact between the liquid desiccant and the vapour stream. During the placing in contact, the water contained in the liquid desiccant is extracted by the stripping agent.

The stripping agent charged with water removed from unit 60 via pipe 162 is introduced into unit 50 which makes it possible at least to collect a fraction rich in C4 to C10 hydrocarbons and including water in liquid form which is removed via pipe 52. Optionally, the separation unit 50 also makes it possible to collect a stream rich in water which is partly sent via pipe 54 to the regeneration unit, and the surplus of which is removed via pipe 53 from the process according to the invention. Stream 54 may be introduced into unit 60 as a backflow into the thermal regeneration column to regulate the functioning thereof and to limit the losses of desiccant. The gaseous fraction not collected from the stripping agent is removed from unit 50 via pipe 151, to be removed from the process according to the invention.

The separation unit 50 may perform a cooling step to partially or even totally condense the stripping agent arriving via pipe 162. The at least partially condensed stream is then introduced into a separating vessel, for example a three-phase separating vessel which makes it possible to separate a gaseous phase, an aqueous liquid phase and a hydrocarbon-based liquid phase.

Step f): either variant 1 or variant 2 described below is performed.

Variant 1: the fraction rich in C4 to C10 hydrocarbons and including water is sent out of the process according to the invention, for example into any unit which can receive wet condensed hydrocarbons. In this case, the fraction rich in C4 to C10 hydrocarbons and including water is not sent into one of the steps a) to e) of the process according to the invention.

Variant 2: said fraction rich in C4 to C10 hydrocarbons and including water is recycled into step b).

The fraction rich in C4 to C10 hydrocarbons and including water is sent via pipe 52 to the three-phase separation unit 10. This fraction may be mixed with the crude hydrocarbon-based gas arriving via pipe 11 upstream of unit 10. The fraction rich in C4 to C10 hydrocarbons and including water may also be introduced into unit 10, for example into the three-phase separation vessel.

Thus, in this embodiment, at least a portion of the recycled C4 to C10 hydrocarbons will again undergo steps b), c) and d) of the process according to the invention and will thus be freed of water. Furthermore, this sequence of steps makes it possible to take up the C15+ heavy hydrocarbons and then to separate them out during step d).

According to a particular embodiment of the invention, the stripping agent charged with water, i.e. the vapour stream rich in C4 to C10 hydrocarbons and charged with water, may be sent directly via pipe 162, without passing via unit 50, to unit 10.

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever.

In the foregoing and in the examples, all temperatures are set forth uncorrected in degrees Celsius and, all parts and percentages are by weight, unless otherwise indicated.

The entire disclosures of all applications, patents and publications, cited herein and of corresponding French application No. 18/71.313, filed Oct. 26, 2019, are incorporated by reference herein.

EXAMPLES

The example of functioning of the process of the invention is described with reference to FIG. 1.

A crude natural gas at saturation is considered, producing 340 tons/h of gas, the composition of which is described in Table 1, pipe 12.

This gas is produced at a pressure of 75 bar g and a temperature of 35° C. The gas is saturated with water, at a content of 0.1 mol %, which delivers a water flow rate of 330 kg/h.

After passing the crude natural gas through the drying unit 20, a dry gas is obtained, the water composition of which is less than 1 ppm mol, i.e. a flow rate of less than 0.3 kg/h, and the composition of which is described in Table 1, pipe 21.

The desiccant liquid is a triethylene glycol with a water-TEG binary purity of 99.9% by weight of TEG and 0.1% by weight of water.

The column for placing the desiccant liquid in contact with the wet gas in unit 20 functions approximately at the inlet conditions of the gas to be treated.

Unit 30 operates by separation via cooling of the gas arriving via pipe 22 to about −53° C. and 4 MPa. Unit 30 makes it possible to extract a stream rich in C4+, the composition of which is described in Table 1, pipe 32, and also a treated gas removed via pipe 31, the composition of which is described in Table 1, pipe 31.

Only about 20% by weight of the total amount of stream 32 rich in C4+ is used for the regeneration of the liquid desiccant in unit 60. After passing into unit 40 and then 70, a stripping agent circulating in pipe 06 is obtained having the composition described in Table 1, pipe 06.

Unit 70 performs vapourization at a temperature of 115° C. In unit 70, the stream rich in C15+ is extracted via pipe 08, having the composition described in Table 1, pipe 08.

TABLE 1

| Composition mol % | Pipe 12 | Pipe 21 | Pipe 31 | Pipe 32 | Pipe 08 | Pipe 06 |
|---|---|---|---|---|---|---|
| $N_2$ | 0.8010 | 0.8019 | 0.8311 | 0.0000 | 0.0000 | 0.0000 |
| $CO_2$ | 1.1998 | 1.1989 | 1.2423 | 0.0013 | 0.0000 | 0.0000 |
| $C_1$ | 88.0639 | 88.1660 | 91.3690 | 0.0009 | 0.0000 | 0.0000 |
| $C_2$ | 4.9928 | 4.9973 | 5.1422 | 1.0501 | 0.0000 | 0.0000 |
| $C_3$ | 2.9827 | 2.9839 | 1.2748 | 52.5037 | 0.0005 | 0.0068 |
| $IC_4$ | 0.4939 | 0.4932 | 0.0758 | 12.5233 | 0.1355 | 1.0391 |
| $n\text{-}C_4$ | 0.5902 | 0.5892 | 0.0569 | 15.4764 | 1.7334 | 10.5207 |
| $IC_5$ | 0.1938 | 0.1942 | 0.0042 | 4.7412 | 5.7889 | 19.3047 |
| $n\text{-}C_5$ | 0.1924 | 0.1928 | 0.0032 | 4.6583 | 7.2832 | 20.6967 |
| $n\text{-}C_6$ | 0.1829 | 0.1833 | 0.0003 | 4.3528 | 17.0613 | 22.7685 |
| $n\text{-}C_7$ | 0.0826 | 0.0833 | 0.0000 | 1.9604 | 16.8173 | 10.7689 |
| $n\text{-}C_8$ | 0.0409 | 0.0409 | 0.0000 | 0.9596 | 17.2637 | 5.3589 |
| BTX | 0.0648 | 0.0590 | 0.0001 | 1.3966 | 11.5913 | 7.4374 |
| NONANE | 0.0097 | 0.0097 | 0.0000 | 0.2274 | 8.5248 | 1.2741 |
| DECANE | 0.0062 | 0.0062 | 0.0000 | 0.1444 | 10.9261 | 0.8063 |
| $C_{11}\text{-}C_{14}$ | 0.0005 | 0.0001 | 0.0000 | 0.0032 | 1.8102 | 0.0166 |
| $C_{15+}$ | 0.0001 | 0.0000 | 0.0000 | 0.0004 | 1.0636 | 0.0013 |
| $H_2O$ | 0.1016 | 0.0001 | 0.0001 | 0.0000 | 0.0000 | 0.0000 |

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

The invention claimed is:

1. A process for dehydrating a wet hydrocarbon-based gas, in which the following steps are performed:
   a) a crude hydrocarbon-based gas including methane, at least C4+ hydrocarbons and water is supplied, and
   b) a three-phase separation is performed on said crude hydrocarbon-based gas, to obtain a wet hydrocarbon-based gas, hydrocarbon-based liquid condensates and an aqueous liquid effluent, and said wet hydrocarbon-based gas is sent to step c),
   c) said wet hydrocarbon-based gas is placed in contact with a regenerated desiccant liquid obtained in step e) to obtain a dehydrated gas and a desiccant liquid charged with water,
   d) a fraction rich in C4 to C10 hydrocarbon compounds contained in the dehydrated gas is separated to obtain a residual gas depleted in C4+ hydrocarbons and a vapour stream rich in C4 to C10 hydrocarbons,
   e) the desiccant liquid charged with water obtained in step c) is regenerated by performing at least one step of stripping the desiccant liquid charged with water by placing it in contact with the vapour stream rich in C4 to C10 hydrocarbons obtained in step d) to obtain the regenerated desiccant liquid and a fraction rich in C4 to C10 hydrocarbons and including water, and
   f) said fraction rich in C4 to C10 hydrocarbons and including water is sent into step b) in which the three-phase separation is performed of said crude hydrocarbon-based gas and also the fraction rich in C4 to C10 hydrocarbons and including water obtained from step e), such that either: A) the crude hydrocarbon-based gas is mixed with the fraction rich in C4 to C10 hydrocarbons and including water before performing the three-phase separation, or B) the three-phase separation is performed in at least one separating vessel in which the crude hydrocarbon-based gas and the fraction rich in C4 to C10 hydrocarbons and including water are separately introduced into the at least one separating vessel.

2. The process according to claim 1, in which, in step f), the crude hydrocarbon-based gas is mixed with the fraction rich in C4 to C10 hydrocarbons and including water before performing the three-phase separation.

3. The process according to claim 1, in which, in step f), the three-phase separation is performed in the at least one separating vessel in which the crude hydrocarbon-based gas and the fraction rich in C4 to C10 hydrocarbons and including water are separately introduced into the at least one separating vessel.

4. The process according to claim 1, in which, in step d), the following steps are performed:
   i) at least a portion of the C4+ hydrocarbons contained in the dehydrated gas is extracted to produce a stream rich in C4+ hydrocarbons,
   ii) the stream rich in C4+ is distilled to produce a stream enriched in C4 to C10 hydrocarbons, and
   iii) at least a portion of the stream enriched in C4 to C10 hydrocarbons is vapourized by heating to produce the vapour stream rich in C4 to C10 hydrocarbons.

5. The process according to claim 4, in which, in step iii), a portion of the stream enriched in C4 to C10 hydrocarbons is vapourized and the vapourized portion is then overheated to produce the vapour stream rich in C4 to C10 hydrocarbons and the non-vapourized portion of the stream enriched in C4 to C10 hydrocarbons is removed from the process in liquid form.

6. The process according to claim 4, in which, in step iii), all of the stream enriched in C4 to C10 hydrocarbons is vapourized and the vapourized stream is then overheated to produce the vapour stream rich in C4 to C10 hydrocarbons.

7. The process according to claim 4, in which, in step iii) the stream enriched in C4 to C10 hydrocarbons is overheated to produce the vapour stream rich in C4 to C10 hydrocarbons.

8. The process according to claim 6, in which the vapourization is performed by heating at a temperature of between 80° C. and 200° C. and a pressure of from 0.1 to 0.5 MPa and the overheating is performed at a temperature of between 210° C. and 250° C. and a pressure of from 0.1 to 0.5 MPa.

9. The process according to claim 1, in which, in step e), before performing the step of stripping the desiccant liquid charged with water, a step of distillation of the desiccant liquid charged with water is performed to remove in vapour form at least a portion of the water and to obtain a partially regenerated liquid desiccant stream, and then the step of stripping the desiccant liquid charged with water is performed on the partially regenerated liquid desiccant stream by placing it in contact with the vapour stream rich in C4 to C10 hydrocarbons obtained in step d) to obtain the regenerated desiccant liquid and a fraction rich in C4 to C10 hydrocarbons and including water.

10. The process according to claim 1, in which, in step e), the placing in contact of the vapour stream rich in C4 to C10 hydrocarbons with the desiccant liquid charged with water makes it possible to obtain the regenerated desiccant liquid, and also a vapour stream rich in C4 to C10 hydrocarbons and containing water, which is at least partially condensed to obtain the fraction rich in C4 to C10 hydrocarbons and including water at least partially in liquid form.

11. The process according to claim 1, in which the crude hydrocarbon-based gas is a natural gas or a refinery gas produced at a temperature T>20° C., at a pressure P>1 MPa, the crude hydrocarbon-based gas being at least saturated with water or with hydrocarbons at the temperature T and at the pressure P.

12. The process according to claim 1, in which the desiccant liquid is chosen from the chemical family of glycols.

13. The process according to claim 1, in which the operating conditions of the separation in step d) are chosen so that the vapour stream enriched in C4 to C10 hydrocarbons comprises aromatic hydrocarbons.

* * * * *